United States Patent
Sudo et al.

(10) Patent No.: US 9,733,842 B2
(45) Date of Patent: Aug. 15, 2017

(54) DETECTION DEVICE, SENSOR, ELECTRONIC APPARATUS, AND MOVING OBJECT

(71) Applicant: Seiko Epson Corporation, Tokyo (JP)

(72) Inventors: Yasuhiro Sudo, Chino (JP); Katsuhiko Maki, Chino (JP)

(73) Assignee: Seiko Epson Corporation (JP)

( * ) Notice: Subject to any disclaimer, the term of this patent is extended or adjusted under 35 U.S.C. 154(b) by 62 days.

(21) Appl. No.: 14/565,927

(22) Filed: Dec. 10, 2014

(65) Prior Publication Data

US 2015/0160868 A1 Jun. 11, 2015

(30) Foreign Application Priority Data

Dec. 11, 2013 (JP) ................ 2013-255893

(51) Int. Cl.
*G06F 3/06* (2006.01)
*G06F 13/42* (2006.01)

(52) U.S. Cl.
CPC .......... *G06F 3/0613* (2013.01); *G06F 3/0659* (2013.01); *G06F 3/0673* (2013.01); *G06F 13/4291* (2013.01)

(58) Field of Classification Search
None
See application file for complete search history.

(56) References Cited

U.S. PATENT DOCUMENTS

| | | | |
|---|---|---|---|
| 4,831,558 A * | 5/1989 | Shoup | G01M 5/0066 702/188 |
| 7,680,228 B2 | 3/2010 | Kanekawa et al. | |
| 2005/0058071 A1 * | 3/2005 | Hirashima | H04Q 11/0067 370/235 |
| 2008/0021972 A1 * | 1/2008 | Huelskamp | A61B 5/0031 709/211 |
| 2008/0069151 A1 * | 3/2008 | Satoh | G06F 13/372 370/503 |
| 2008/0087084 A1 * | 4/2008 | Kanai | G01P 15/097 73/514.29 |
| 2012/0072628 A1 | 3/2012 | Crockett et al. | |
| 2013/0282941 A1 * | 10/2013 | van Dijk | H04L 12/403 710/110 |

FOREIGN PATENT DOCUMENTS

EP 0959413 A2 11/1999
JP 2005-141412 A 6/2005

OTHER PUBLICATIONS

Extended European Search Report for Application No. EP 14 19 7132 dated Apr. 29, 2015 (5 pages).

* cited by examiner

*Primary Examiner* — Henry Tsai
*Assistant Examiner* — Dean Phan
(74) *Attorney, Agent, or Firm* — Harness, Dickey & Pierce, P.L.C.

(57) ABSTRACT

A detection device includes an interface unit that performs communication with a host device which is a master, and a storage unit that stores information on a data transmission order of its own detection device. Ina case where the host device designates a common address which has a plurality of detection devices as common destinations, and issues a read command, the interface unit transmits the detected data to the host device in the data transmission order.

18 Claims, 10 Drawing Sheets

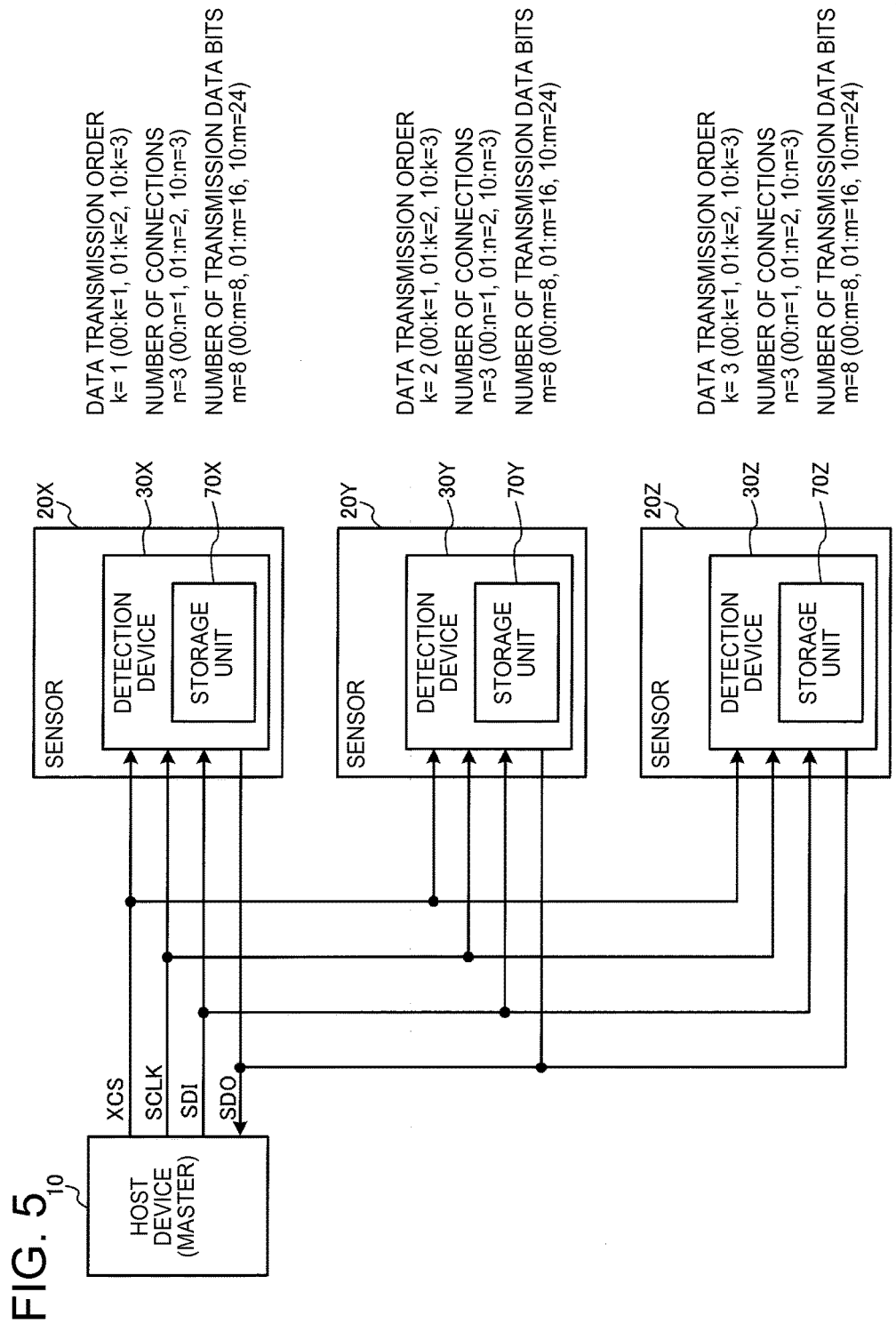

DETECTION DEVICE, SENSOR, ELECTRONIC APPARATUS, AND MOVING OBJECT

BACKGROUND

1. Technical Field

The present invention relates to a detection device, a sensor, an electronic apparatus, and a moving object.

2. Related Art

As a communication method between a master and a slave, there is a communication standard called a serial peripheral interface (SPI). In a case where a master and a plurality of slaves are connected to each other through communication using the SPI, the communication is performed by using three signals including a clock signal, a data input signal, and a data output signal, and also a chip select signal.

JP-A-2005-141412 discloses a method in which a signal for selecting only an operation of either transmission or reception is output in addition to a chip select signal in the SPI, and thus conflict between serial signals from slaves to a master is prevented.

In a case where communication is performed between a single master and a plurality of slaves by using the SPI, control of a chip select signal or the issuing of a command is required for each slave to read data from each slave by the master. For this reason, there is a problem in that the time required to read data from the slaves is lengthened.

In a multi-axis physical quantity sensor such as a multi-axis gyro sensor or a multi-axis acceleration sensor, communication is performed between a host device such as a microcomputer and an X axis sensor, a Y axis sensor, and a Z axis sensor. For example, the host device issues a read command to each of the X axis sensor, the Y axis sensor, and the Z axis sensor, and reads detected data from each sensor. In such a multi-axis physical quantity sensor, it is necessary to efficiently perform data communication between the host device and the sensors.

SUMMARY

An advantage of some aspects of the invention is to provide a detection device, a sensor, an electronic apparatus, and a moving object, enabling a host device to efficiently read detected data.

The invention can be implemented as the following forms or aspects.

An aspect of the invention relates to a detection device including a detection circuit that performs a detection process on the basis of a signal from a physical quantity transducer and outputs detected data; an interface unit that performs communication with a host device which is a master; and a storage unit that stores information on the data transmission order of its own detection device, in which, in a case where the host device designates a common address which has a plurality of detection devices connected to the host device through communication as common destinations, and issues a read command, the interface unit transmits the detected data to the host device in the data transmission order.

According to the aspect of the invention, the detection process is performed on the basis of the signal from the physical quantity transducer and the detected data is output from the detection circuit. The information on the data transmission order of its own detection device is stored in the storage unit. In a case where the host device designates a common address and issues a read command, the interface unit transmits the detected data from the detection circuit to the host device in the data transmission order thereof. In the above-described manner, even if the host device does not issue separate read commands to a plurality of detection devices, and for example, issues only a single read command, it is possible to read detected data from each detection device. Therefore, the host device can efficiently read detected data and thus to reduce the time required to read the detected data.

In the detection device according to the aspect of the invention, the storage unit may store information on the number of connections of the plurality of detection devices which are connected to the host device through communication therewith.

With this configuration, each of the plurality of detection devices can perform efficient transmission control of detected data by using the number of connections.

In the detection device according to the aspect of the invention, in a case where the number of connections of the plurality of detection devices is set to n, and the data transmission order is set to k (where 1≤k≤n), the interface unit may transmit the detected data to the host device in a k-th order which is the data transmission order, and then transmit the detected data to the host device in a (n+k)-th order.

With this configuration, the detection device can transmit the detected data to the host device in the k-th order which is the data transmission order, and then can transmit the detected data again in the (n+k)-th order. Therefore, it is possible to realize efficient transmission control of detected data by using the number of connections.

In the detection device according to the aspect of the invention, the storage unit may store information on the number of transmission data bits of the detected data, and the interface unit may transmit the detected data with the number of transmission data bits to the host device in the data transmission order.

With this configuration, it is possible to realize efficient transmission control of the detected data in which the number of transmission data bits is also reflected.

In the detection device according to the aspect of the invention, in a case where the host device designates a separate address and issues a read command, the interface unit may transmit the detected data to the host device when the separate address matches a separate address of its own detection device.

With this configuration, the host device can designate a desired detection device from among a plurality of detection devices by using a separate address, and can read detected data from the detection device.

In the detection device according to the aspect of the invention, the interface unit may perform communication with the host device by using a clock signal, a data input signal, and a data output signal.

In the detection device according to the aspect of the invention, the physical quantity transducer may be a vibrator, and the detection circuit may be a circuit which detects angular velocity around a predetermined axis.

Another aspect of the invention relates to a sensor including the detection device described above; and the physical quantity transducer.

Still another aspect of the invention relates to an electronic apparatus including the detection device described above.

Yet another aspect of the invention relates to a moving object including the detection device described above.

BRIEF DESCRIPTION OF THE DRAWINGS

Embodiments of the invention will be described with reference to the accompanying drawings, wherein like numbers reference like elements.

FIG. 5 is a diagram illustrating the data transmission order, the number of connections, and the number of transmission data bits.

DESCRIPTION OF EXEMPLARY EMBODIMENTS

Hereinafter, an embodiment of the invention will be described in detail. The present embodiment described below does not improperly limit the scope of the invention recited in the appended claims, and all configurations described in the present embodiment are not essential solving means of the invention.

1. SPI Communication

Figure 1A:
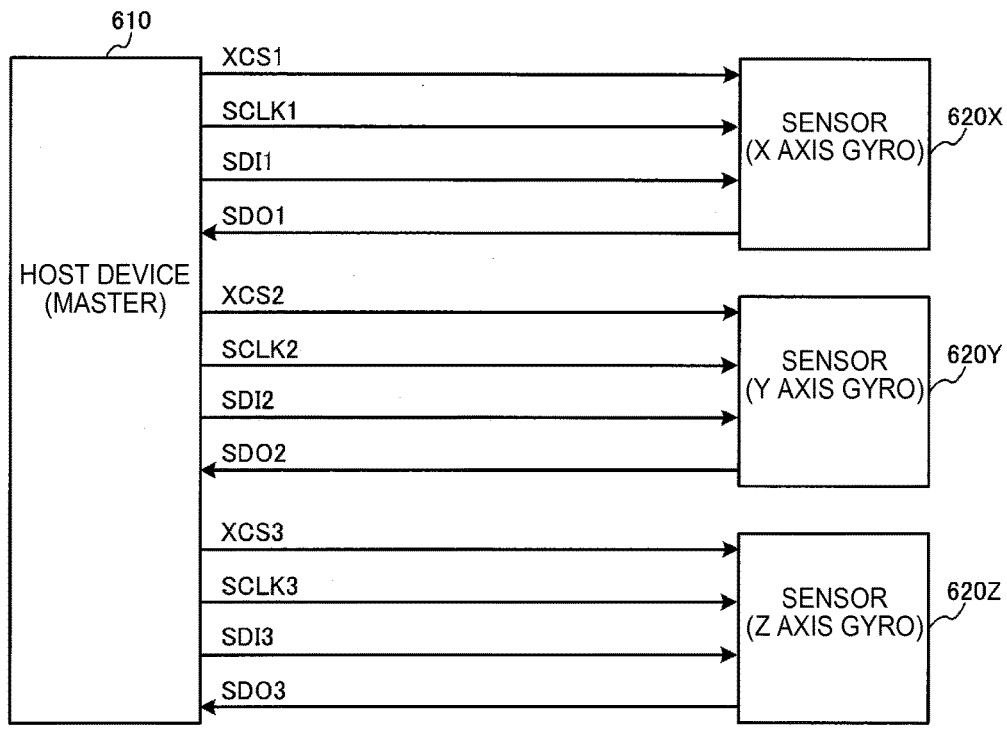
FIGS. 1A and 1B are diagrams illustrating an SPI communication method as comparative examples.
Figure 1B:
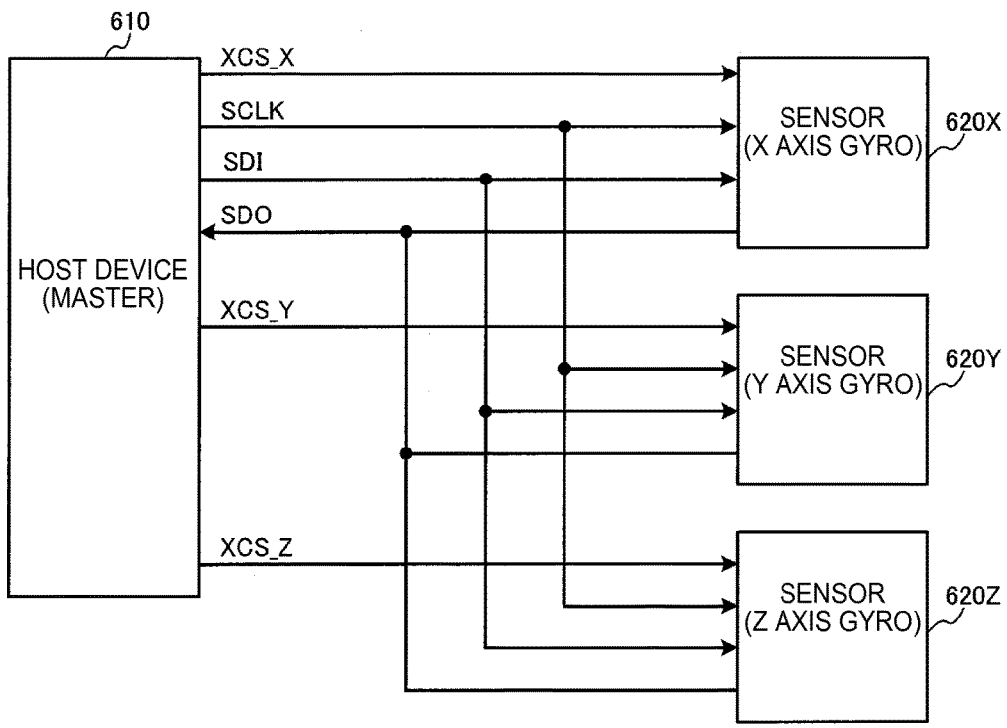

FIGS. 1A and 1B illustrate examples of SPI communication as comparative examples of the present embodiment. In FIGS. 1A and 1B, a host device 610 which is a master is connected to sensors 620X, 620Y and 620Z which are slaves through communication therewith by using a serial peripheral interface (SPI).

The host device 610 is, for example, a processing unit such as a microcomputer. The sensors 620X, 620Y and 620Z are respectively, for example, an X axis gyro sensor, a Y axis gyro sensor, and a Z axis gyro sensor. In FIGS. 1A and 1B, the host device 610 is connected to the sensors 620X, 620Y and 620Z which are an X axis gyro sensor, a Y axis gyro sensor, and a Z axis gyro sensor through communication therewith by using the SPI, and thus a multi-axis gyro sensor is realized.

In a communication method shown in FIG. 1A, a chip select signal, a clock signal, a data input signal, and a data output signal are all separately provided for the sensor 620X, the sensor 620Y, and the sensor 620Z. In other words, XCS1, XCS2, and XCS3 are chip select signals for the sensor 620X, the sensor 620Y, and the sensor 620Z, and SCLK1, SCLK2, and SLCK3 are clock signals for the sensor 620X, the sensor 620Y, and the sensor 620Z. SDI1, SDI2, and SDI3 are data input signals for the sensor 620X, the sensor 620Y, and the sensor 620Z, and SDO1, SDO2, and SDO3 are data output signals for the sensor 620X, the sensor 620Y, and the sensor 620Z.

In FIG. 1B, a clock signal SCLK is shared by the sensors 620X, 620Y and 620Z. In other words, a signal line of SCLK of the host device 610 is connected in common to the sensors 620X, 620Y and 620Z. Similarly, a data input signal SDI and a data output signal SDO are shared by the sensors 620X, 620Y and 620Z, and signal lines of SDI and SDO are connected in common to the sensors 620X, 620Y and 620Z.

On the other hand, a chip select signal is not shared, and a chip select signal XCS_X for the sensor 620X, a chip select signal XCS_Y for the sensor 620Y, and a chip select signal XCS_Z for the sensor 620Z are separately provided.

In a communication method shown in FIG. 1B, in a case where the host device 610 reads detected data from the sensor 620X, first, the chip select signal XCS_X for the sensor 620X is activated (low level). Consequently, the sensor 620X is in a selected state, and the sensors 620Y and 620Z are in an unselected state. In other words, the sensor 620X recognizes that the sensor is selected due to the chip select signal XCS_X.

Next, the host device 610 issues a read command to the sensor 620X by using the data input signal SDI. In other words, the host device 610 transmits data indicating the read command to the sensor 620X by using the data input signal SDI.

Next, the host device 610 reads detected data from the sensor 620X by using the clock signal SCLK and the data output signal SDO. In other words, the sensor 620X having received the read command transmits the detected data to the host device 610 in synchronization with the clock signal SCLK from the host device 610.

Subsequently, the host device 610 performs the same operation as described above in a case of reading detected data from the sensor 620Y. In other words, first, the host device 610 activates the chip select signal XCS_Y for the sensor 620Y. Next, the host device 610 issues a read command to the sensor 620Y by using the clock signal SCLK and the data input signal SDI. Next, the host device 610 reads detected data from the sensor 620Y by using the clock signal SCLK and the data output signal SDO. Subsequently, also in a case where detected data is read from the sensor 620Z, the host device 610 performs the same operation.

According to the communication method shown in FIG. 1B, there is an advantage in that the number of I/O ports of the host device 610 occupied by the SPI communication can be reduced compared with the communication method of FIG. 1A. In other words, in FIG. 1A, the number of I/O ports of the host device 610 required to perform the SPI communication is 12, but, in FIG. 1B, the number of necessary I/O ports is 6.

However, in the communication method shown in FIG. 1B, in a case where detected data is read from the sensors 620X, 620Y and 620Z, control of the chip select signal and issuing of the command are necessary for each sensor. For this reason, the time required to read detected data is lengthened. For example, a case is assumed in which detected data is read from the sensor 620X, and then detected data is read from the sensor 620Y. In this case, a control period of the chip select signal for the sensor 620X, an issuing period of the command for the sensor 620X, a reading period of detected data from the sensor 620X, a control period of the chip select signal for the sensor 620Y, an issuing period of the command for the sensor 620Y, and a reading period of detected data from the sensor 620Y, are necessary. Therefore, a long period of time is necessary until the detected data is finally read from the sensor 620Y.

According to the communication method shown in FIG. 1B, the number of I/O ports of the host device 610 required to perform the SPI communication can be reduced compared with the communication method of FIG. 1A, but, notwithstanding, six I/O ports are necessary. The host device 610 not only performs processes related to the sensors 620X, 620Y and 620Z but also other various processes, and thus if the six I/O ports are used to perform the processes related to the sensors 620X, 620Y and 620Z, convenience is reduced.

2. Detection Device, Sensor, and Electronic Apparatus

Figure 2:
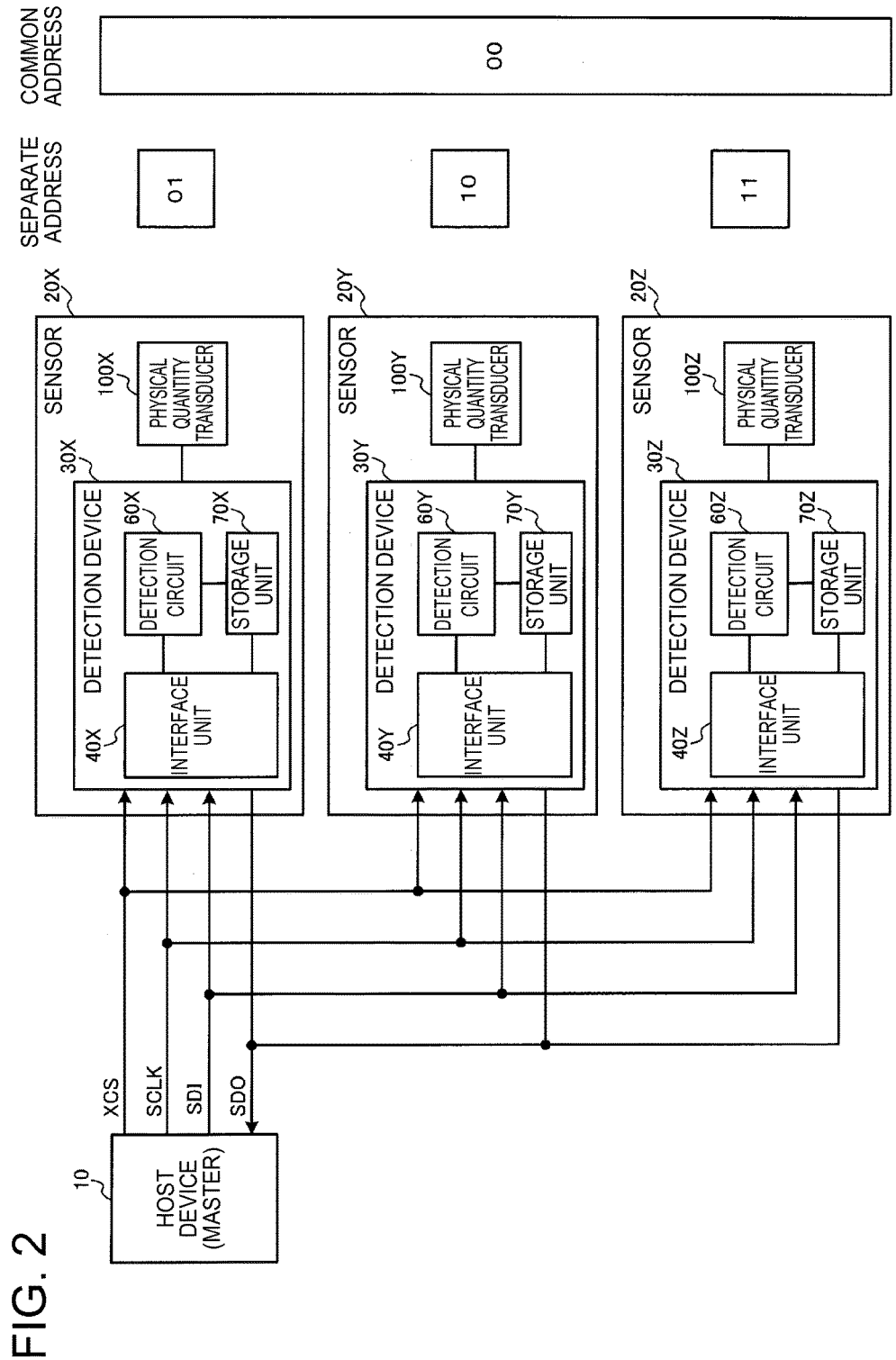
FIG. 2 illustrates a configuration example of a detection device, a sensor, and an electronic apparatus of the present embodiment.

FIG. 2 illustrates a configuration example of a detection device, a sensor, and an electronic apparatus of the present embodiment.

In FIG. 2, the electronic apparatus of the present embodiment includes a host device 10, and sensors 20X, 20Y and 20Z. The host device 10 may be implemented by various processors (a CPU or an MPU), a hardware circuit such as an ASIC, or the like. For example, a microcomputer may be used as the host device 10 (host controller).

The electronic apparatus may include a display unit, an operation unit, a memory, and the like (none of which are illustrated). The memory stores control programs or various data items, or functions as a work area or a data storage area. The operation unit is used for a user to operate the electronic apparatus, and the display unit displays various information pieces to the user.

The sensors 20X, 20Y and 20Z are respectively, for example, an X axis gyro sensor, a Y axis gyro sensor, and a Z axis gyro sensor. In FIG. 2, the three sensors 20X, 20Y and 20Z are provided, but the number of sensors may be two, or four or more. The sensors 20X, 20Y and 20Z may be sensors other than the gyro sensors, and may be, for example, acceleration sensors. In this case, the sensors 20X, 20Y and 20Z are respectively an X axis acceleration sensor, a Y axis acceleration sensor, and a Z axis acceleration sensor. In the following description, as an example, a description will be made of a case where physical quantity transducers (100X, 100Y, and 100Z) are piezoelectric type vibrators (vibration gyros), and sensors (20X, 20Y, and 20Z) are gyro sensors, but the invention is not limited thereto. For example, the invention is applicable to a capacitance detection type vibrator (vibration gyro) formed of a silicon substrate or the like, or various physical quantity transducers such as a sensor (acceleration sensor) which detects a physical quantity equivalent to angular velocity information or physical quantities other than acceleration information. The electronic apparatus of the present embodiment can be various apparatuses such as a digital camera, a video camera, a mobile phone, a car navigation system, a robot, a game machine, a watch, a health apparatus, or a portable information terminal.

In FIG. 2, detection devices 30X, 30Y and 30Z respectively include interface units 40X, 40Y and 40Z, detection circuits 60X, 60Y and 60Z, and storage units 70X, 70Y and 70Z. The sensors 20X, 20Y and 20Z respectively include the detection devices 30X, 30Y and 30Z and physical quantity transducers 100X, 100Y and 100Z.

Hereinafter, among the detection devices 30X, 30Y and 30Z, focusing on the detection device 30X, a configuration and an example thereof will be described. Configurations and operations of the other detection devices 30Y and 30Z are the same as those of the detection device 30X, and thus a description thereof will be omitted as appropriate. Configurations and operations of the sensors 20Y and 20Z are the same as those of the sensor 20X, and thus description thereof will be omitted as appropriate.

The detection device 30X performs a detection process on the basis of a signal from the physical quantity transducer 100X, and outputs detected data. For example, a process of detecting a desired signal is performed on the basis of a signal from the physical quantity transducer 100X. The analog detected signal obtained through the detection process is A/D-converted in order to be output as digital detected data. In a case where the sensors 20X, 20Y and 20Z are gyro sensors, the physical quantity transducers 100X, 100Y and 100Z are vibrators, and the detection device 30X is, for example, a circuit which detects angular velocity around the X axis (in a broad sense, around a predetermined axis). The detected data from the detection device 30X is angular velocity data around the X axis. The detection devices 30Y and 30Z are circuits which detect angular velocity around the Y and Z axes, and the detected data from the detection devices 30Y and 30Z are angular velocity data around the Y and Z axes. In this case, a driving circuit which drives the vibrator is also provided.

The interface unit 40X performs communication with the host device 10 which is a master. For example, the interface unit 40X performs communication with the host device by using a clock signal SCLK, a data input signal SDI, and a data output signal SDO.

Specifically, in FIG. 2, the clock signal SCLK, the data input signal SDI, and the data output signal SDO are shared by the detection devices 30X, 30Y and 30Z (the sensors 20X, 20Y and 20Z), signal lines of SCLK, SDI, and SDO of the host device 10 are connected in common to the detection devices 30X, 30Y and 30Z. The interface unit 40X performs communication with the host device 10, for example, in an SPI communication method, by using the clock signal SCLK, the data input signal SDI, and the data output signal SDO.

In FIG. 2, a chip select signal XCS is also shared by the detection devices 30X, 30Y and 30Z (the sensors 20X, 20Y and 20Z), and a signal line of XCS of the host device 10 is connected in common to the detection devices 30X, 30Y and 30Z. In other words, in FIG. 1B, separate chip select signals corresponding to the respective sensors are provided, but, in FIG. 2, a single chip select signal XCS is shared.

The storage unit 70X stores various pieces of information. The storage unit 70X (70Y and 70Z) is implemented by a nonvolatile memory such as an erasable programmable ROM (EPROM), or a one-time programmable ROM (OTP). The storage unit 70X (70Y and 70Z) may be implemented by semiconductor memories other than the nonvolatile memory.

The storage unit 70X stores information on the data transmission order of its own detection device 30X. For example, the storage unit 70X stores information on the data transmission order of its own detection device 30X among the detection devices 30X, 30Y and 30Z (in a broad sense, a plurality of detection devices) as slaves which are connected to the host device 10 through communication therewith. Similarly, the storage unit 70Y of the detection device 30Y stores information on the data transmission order of its own detection device 30Y, and the storage unit 70Z of the detection device 30Z stores information on the data transmission order of its own detection device 30Z. The information on the data transmission order may be the data transmission order, and may be information for specifying the data transmission order.

It is assumed that the host device 10 designates a common address (for example, 00) which has the detection devices 30X, 30Y and 30Z (a plurality of detection devices) connected to the host device 10 through communication as common destinations, and issues a read command. In this case, the interface unit 40X transmits detected data to the host device 10 in the data transmission order thereof stored in the storage unit 70X.

On the other hand, it is assumed that the host device 10 designates separate addresses (slave addresses) and issues a read command. In this case, the interface unit 40X transmits detected data to the host device 10 in a case where the separate address designated by the host device 10 matches a separate address (for example, 01) of its own detection device 30X (the sensor 20X).

For example, in FIG. 2, it is assumed that a transmission order for the detection device 30X is k=1, a transmission order for the detection device 30Y is k=2, and a transmission order for the detection device 30Z is k=3. In addition, it is assumed that a common address is 00, and separate addresses for the detection devices 30X, 30Y and 30Z are respectively 01, 10, and 11.

In this case, when the host device 10 designates the common address 00 and issues a read command, the interface unit 40X of the detection device 30X transmits detected data in the first transmission order (k=1). The interface unit 40Y of the detection device 30Y transmits detected data in the second transmission order (k=2), and the interface unit 40Z of the detection device 30Z transmits detected data in the third transmission order (k=3).

On the other hand, when the host device 10 designates the separate address 01 and issues a read command, the interface unit 40X of the detection device 30X transmits detected data. Similarly, when the host device 10 designates the separate address 10 and issues a read command, the interface unit 40Y of the detection device 30Y transmits detected data. In addition, when the host device 10 designates the separate address 11 and issues a read command, the interface unit 40Z of the detection device 30Z transmits detected data.

The storage unit 70X stores information on the number of connections of detection devices which are connected to the host device 10 through communication therewith. For example, in FIG. 2, the number of connections is n=3, and thus information on n=3 is stored. Similarly, the storage units 70Y and 70Z store information on the number of connections. The information on the number of connections may be the number of connections and may be information for specifying the number of connections.

It is assumed that the number of connections of the detection devices is set to n, and the data transmission order is set to k (where k and n are natural numbers satisfying $1 \leq k \leq n$). In this case, the interface unit 40X transmits detected data to the host device 10 in the first order (a k-th order; k=1) which is the data transmission order, and then transmits detected data to the host device 10 in the fourth order (in a broad sense, a (n+k)-th order). Similarly, detected data is transmitted in the seventh order (a second (n+k)-th order) and the tenth order (a third (n+k)-th order).

Similarly, the interface unit 40Y transmits detected data in the second order (a k-th order; k=2) which is the data transmission order, and then transmits detected data in the fifth order (a (n+k)-th order). The interface unit 40Z transmits detected data in the third order (a k-th order; k=3) which is the data transmission order, and then transmits detected data in the sixth order (a (n+k)-th order).

The storage unit 70X stores information on the number of transmission data bits of detected data. The number of transmission data bits may be stored in a nonvolatile memory (a register or the like). A user may set any number of transmission data bits. The interface unit 40X transmits detected data with the number of transmission data bits to the host device 10 in the data transmission order thereof. Similarly, the storage unit 70Y of the detection device 30Y stores information on the number of transmission data bits of detected data, and the interface unit 40Y transmits detected data with the number of transmission data bits in the data transmission order thereof. The storage unit 70Z of the detection device 30Z stores information on the number of transmission data bits of detected data, and the interface unit 40Z transmits detected data with the number of transmission data bits in the data transmission order thereof. The information on the number of transmission data bits may be the number of transmission data bits, and may be information for specifying the number of transmission data bits.

3. Method of Present Embodiment

Next, a detailed description will be made of a method of operation of the present embodiment with reference to the drawings.

In the present embodiment, a separate address is assigned to each of a plurality of slaves connected to a host through communication therewith. The separate address is stored in a storage unit such as a nonvolatile memory of each slave. Each slave performs communication with the host only in a case where a separate address which is input from the host along with a command matches the separate address assigned thereto.

For example, in FIG. 2, it is assumed that separate addresses 01, 10 and 11 are assigned to the detection devices 30X, 30Y and 30Z which are slaves. Therefore, the detection device 30X performs subsequent communication (register writing and reading, and command issuing) only in a case where a separate address designated by the host matches the separate address 01 thereof. The detection device 30Y performs communication only in a case where a separate address designated by the host matches the separate address 10 thereof. The detection device 30Z performs communication only in a case where a separate address designated by the host matches the separate address 11 thereof.

In the present embodiment, a common address is also prepared. The common address (global address) is an address which has a plurality of slaves connected to the host through communication as common destinations. For example, the common address is an address which has all of the plurality of slaves as destinations. Therefore, in a case where the common address is designated by the host, all the slaves are operated.

Data is output from an SDO terminal of the slave only in a case where the addresses match each other, and the terminal is set in a high impedance state in a case where the addresses do not match each other. Therefore, a conflict between signals is prevented.

Figure 3:
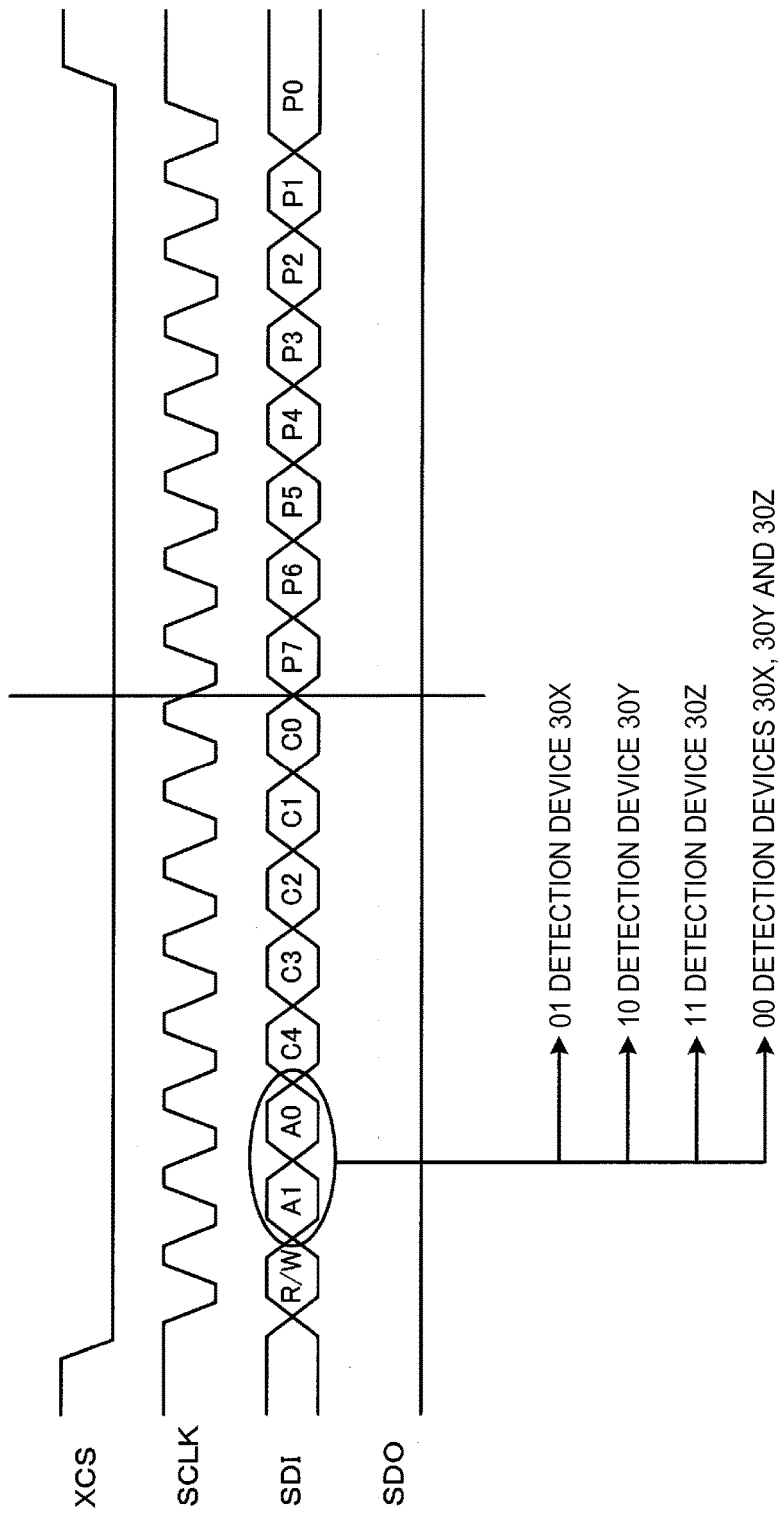
FIG. 3 illustrates a signal waveform example for explaining an operation according to the present embodiment.

FIG. 3 illustrates a signal waveform example for explaining an operation according to the present embodiment. In FIG. 3, R/W is a bit for giving an instruction for reading and writing, and A[1:0] is bits for designating an address. As described above, A[1:0]=01, 10 and 11 designates separate addresses (slave addresses), and A[1:0]=00 designates a common address (global address). C[4:0] is bits indicating command content and a register address, and P[7:0] is data or the like which is transmitted to a register of the detection device.

As mentioned above, in the present embodiment, an instruction for reading and writing, indication of an address, and indication of command content and a register address are performed by using the data input signal SDI. In other words, the host device 10 sends an instruction for reading and writing, indication of an address, and indication of command content and a register address to the detection devices 30X, 30Y and 30Z which are slaves, by using the data input signal SDI.

As illustrated in FIG. 3, in a case where A[1:0]=01, the detection device 30X is designated by the address; in a case where A[1:0]=10, the detection device 30Y is designated by the address; in a case where A[1:0]=11, the detection device 30Z is designated by the address. In a case where A[1:0]=00, all of the detection devices 30X, 30Y and 30Z are addressed.

Figure 4:
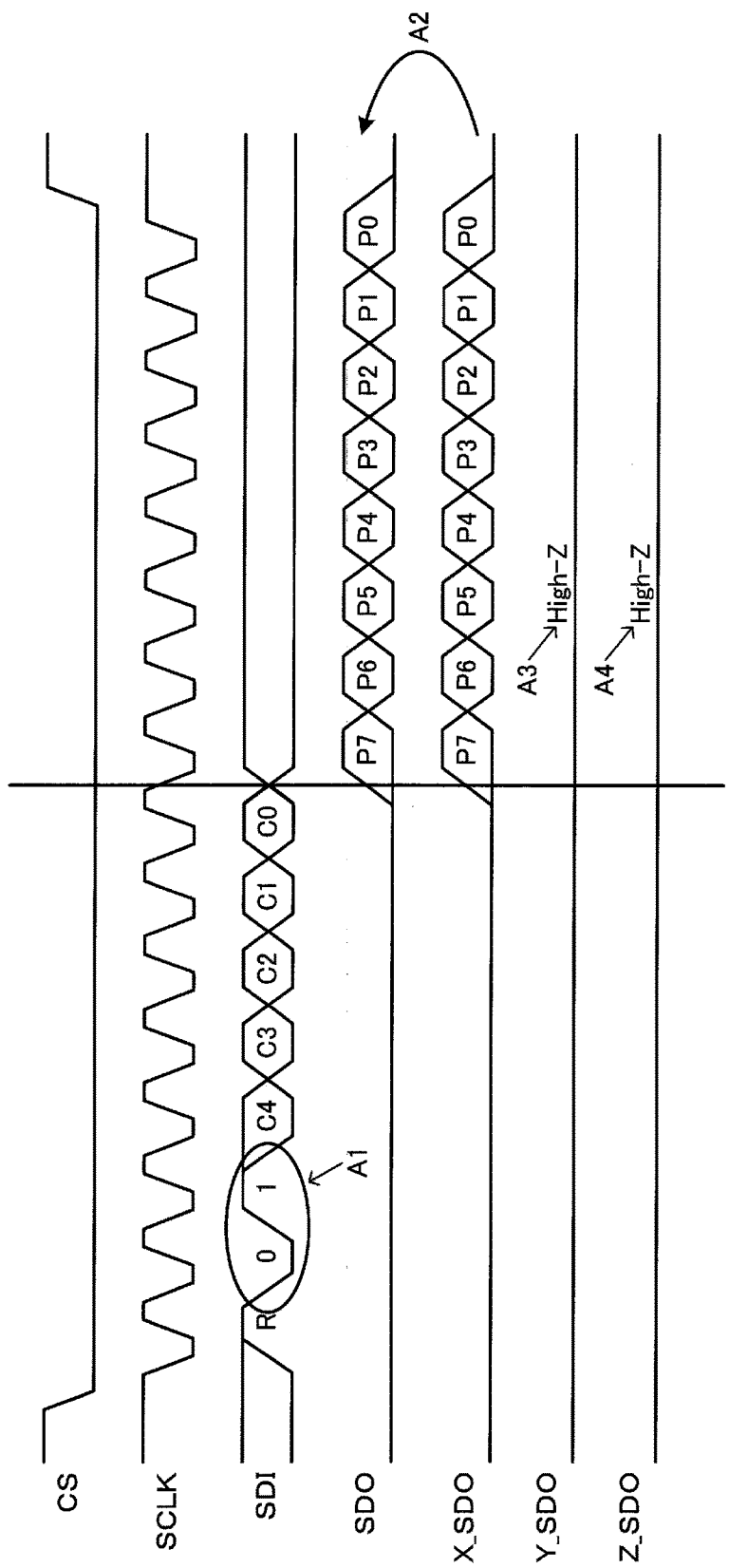
FIG. 4 illustrates a signal waveform example for explaining an operation according to the present embodiment.

FIG. 4 illustrates a signal waveform example in a case where A[1:0]=01 as indicated by A1. R/W is R, and thus a reading operation is performed.

In FIG. 4, since A[1:0]=01, and the detection device 30X is addressed, the detection device 30X outputs detected data. Therefore, as indicated by A2, the detected data is output from an X_SDO terminal of the detection device 30X to the SDO signal line. Consequently, the host device 10 can read the detected data.

At this time, as indicated by A3 and A4 of FIG. 4, Y_SDO and Z_SDO terminals of the detection devices 30Y and 30Z are set to be in a high impedance state. In the above-described manner, it is possible to prevent a conflict between signals in a case where the SDO signal line is connected in common as in the present embodiment.

FIG. 5 is a diagram illustrating a data transmission order, the number of connections, and the number of transmission data bits. In FIG. 5, data transmission orders of the detection devices 30X, 30Y and 30Z are respectively k=1, k=2, and k=3. The number of connections of the detection devices 30X, 30Y and 30Z connected to the host device 10 is n=3. The number of transmission data bits of detected data is m=8.

For this reason, the storage unit 70X of the detection device 30X stores information on the data transmission order k=1, the number of connections n=3, and the number of transmission data bits m=8. The storage unit 70Y of the detection device 30Y stores information on the data transmission order k=2, the number of connections n=3, and the number of transmission data bits m=8. The storage unit 70Z of the detection device 30Z stores information on the data transmission order k=3, the number of connections n=3, and the number of transmission data bits m=8.

Here, the stored information on the data transmission order k, the number of connections n, and the number of transmission data bits m may be k, n, and m, and may be information for specifying k, n, and m. In FIG. 5, regarding the data transmission order, for example, in a case where k=1, 2-bit information 00 is stored; in a case where k=2, 2-bit information 01 is stored; and in a case where k=3, 2-bit information 10 is stored. Regarding the number of connections, for example, in a case where n=1, 2-bit information 00 is stored; in a case where n=2, 2-bit information 01 is stored; and in a case where n=3, 2-bit information 10 is stored. Regarding the number of transmission data bits, in a case where m=8 bits, 2-bit information 00 is stored; in a case where m=16 bits, 2-bit information 01 is stored; and in a case where m=24 bits, 2-bit information 10 is stored. An aspect of storing the information on the data transmission order, the number of connections, and the number of transmission data bits is not limited thereto. There may be a modification in which the number of connections and the number of transmission data bits are not stored in the storage unit.

Figure 6A:
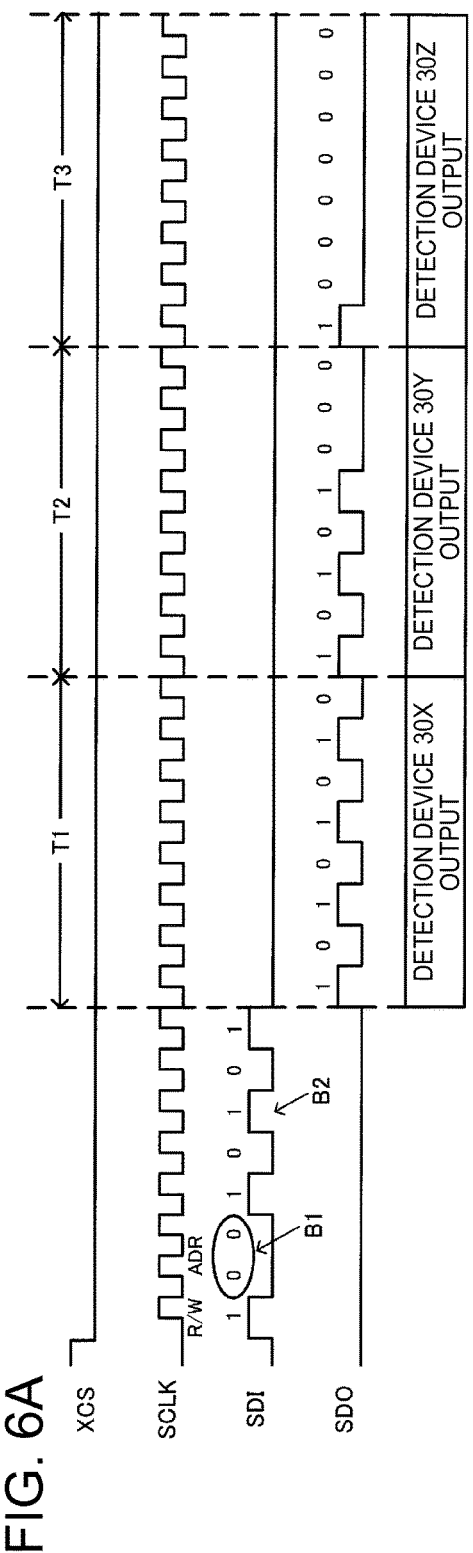
FIGS. 6A and 6B are signal waveform examples for explaining an operation according to the present embodiment.
Figure 6B:
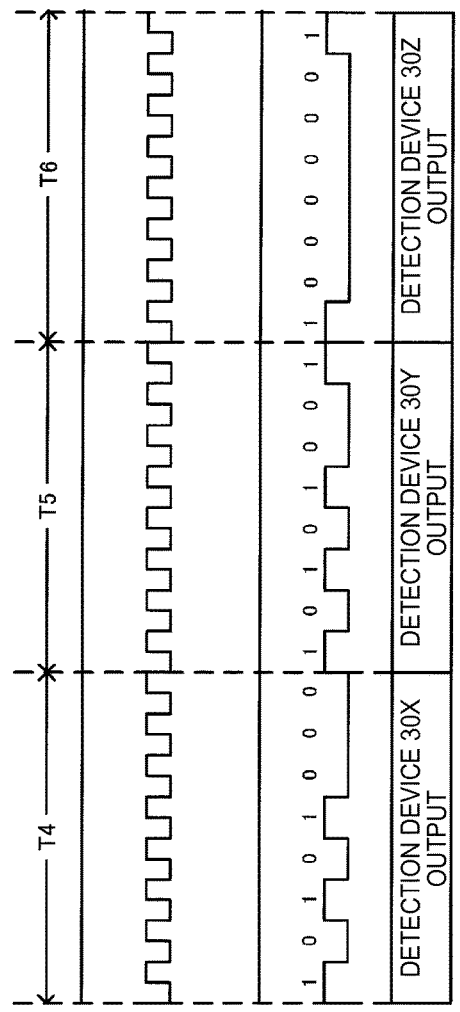

As in FIG. 5, FIGS. 6A and 6B illustrate signal waveform examples for explaining an operation according to the present embodiment in a case where the information on the data transmission order, the number of connections, and the number of transmission data bits are stored in the storage units 70X, 70Y and 70Z.

In FIG. 6A, as indicated by B1, A[1:0]=00, and thus a common address is designated. A read command of detected data is issued as indicated by B2. Therefore, detected data is continuously read from all of the detection devices 30X, 30Y and 30Z.

As illustrated in FIG. 5, the data transmission orders of the detection devices 30X, 30Y and 30Z are respectively k=1, k=2, and k=3, and the number of transmission data bits is m=8.

Thus, in a period T1, detected data with m=8 bits is output from the detection device 30X whose data transmission order is k=1. In the next period T2, detected data with m=8 bits is output from the detection device 30Y whose data transmission order is k=2. In the next period T3, detected data with m=8 bits is output from the detection device 30Z whose data transmission order is k=3.

FIG. 6B illustrates a signal waveform example in a case where detected data is further continuously read after the period T3 of FIG. 6A. In FIG. 6B, in a period T4 after the period T3, detected data is output from the detection device 30X. In the next period T5, detected data is output from the detection device 30Y, and, in the next period T6, detected data is output from the detection device 30Z.

In other words, in the present embodiment, the number of connections n is stored. Therefore, the detection device 30X can recognize that it is preferable that detected data be output in a data transmission order (the period T1) of k=1, and then detected data be output in a data transmission order (the period T4) of k=1+n=1+3=4. The detection device 30Y can recognize that it is preferable that detected data be output in a data transmission order (the period T2) of k=2, and then detected data be output in a data transmission order (the period T5) of k=2+n=2+3=5. Similarly, the detection device 30Z can recognize that it is preferable that detected data be output in a data transmission order (the period T3) of k=3, and then detected data be output in a data transmission order (the period T6) of k=3+n=3+3=6. Thus, for example, in a case where the periods T1 to T3 in which the detected data is output from the detection devices 30X, 30Y and 30Z are set to one cycle, this cycle can be continuously repeated. For example, in FIG. 6A, reading is performed in a first cycle of the periods T1 to T3, and, in FIG. 6B, reading is performed in a second cycle of the periods T4 to T6. Also subsequently, cycles, such as a third cycle and a fourth cycle, for reading detected data can be continuously executed.

As described above, according to the present embodiment, if a common address is designated and a read command is issued by the host device, each detection device transmits detected data in a preset data transmission order. The number of transmission data bits of the transmitted detected data is also the preset number of bits. Therefore, the host device can read and acquire the detected data items which are sequentially and continuously transmitted from the respective detection devices.

In other words, a data transmission order is stored in the storage unit such as a nonvolatile memory, and thus the order in which each detection device preferably outputs detected data can be determined in advance. The number of connections or the number of transmission data bits is stored in the storage unit, and thus the number of detection devices that are connected to the host device or the number of bits of detected data output from each detection device can also be determined in advance. Therefore, each detection device only has to output detected data according to the determination, and thus a process or control thereof can be simplified. The host device also only has to acquire the detected data from the detection device according to the determination, and thus a process or control thereof can be simplified. Since a transmission source of the acquired data or the number of bits of the data can be appropriately judged on the basis of the determination, it is possible to prevent incorrect data from being acquired. Thus, it is possible to efficiently and correctly perform a reading operation of detected data.

In the SPI communication of the comparative example of FIG. 1B or the like, it is necessary to perform selection of each detection device using a chip select signal and issuing of a command to each detection device before detected data is read from each detection device. For example, a first detection device is selected by using the chip select signal, a command is issued to the selected first detection device, and detected data is read from the first detection device. Next, a second detection device is selected by using the chip select signal, a command is issued to the selected second detection device, and detected data is read from the second detection device. Therefore, in the SPI communication of the comparative example, the continuous reading of detected data as indicated in the periods T1, T2 and T3 of FIG. 6A of the present embodiment cannot be realized, and a long period of time is required to read detected data from a plurality of detection devices.

In contrast, in the present embodiment, as indicated by B1 of FIG. 6A, a common address is designated, and, as indicated by B2, only a single read command is issued, and thus detected data items can be continuously read from the detection devices 30X, 30Y and 30Z as indicated by the periods T1, T2 and T3. Therefore, compared with the comparative example of FIG. 1B, it is possible to efficiently read detected data, and thus the time required to read detected data from a plurality of detection devices can be reduced.

For example, in a multi-axis gyro sensor (multi-axis physical quantity sensor), information on the number of incorporated gyro sensors of the respective axes, an order in which detected data is read from each gyro sensor, or the number of bits of detected data is specified during the manufacturing of a product. The number of bits of detected data may be arbitrarily set by a user after manufacturing. Therefore, during the manufacturing of a product, a data transmission order, the number of connections, and the number of transmission data bits may be determined on the basis of the information and may be stored in a storage unit constituted by a nonvolatile memory or the like. In the above-described manner, a host device can efficiently acquire detected data from each gyro sensor in the optimum data reading sequence corresponding to the product, and can efficiently perform various processes based on the acquired detected data.

As in FIG. 2, in the present embodiment, the chip select signal can be shared by a plurality of detection devices. Therefore, it is possible to reduce the number of I/O ports of the host device, occupied by the SPI communication. For example, in FIG. 1A, twelve I/O ports are necessary, and, in FIG. 1B, six I/O ports are necessary, but, in FIG. 2, four I/O ports are necessary. Thus, the number of I/O ports occupied by the SPI communication can be reduced, and thus the I/O ports of the host device can be used for other usage, thereby improving convenience or the like.

4. Specific Configuration of Detection Device

Figure 7:
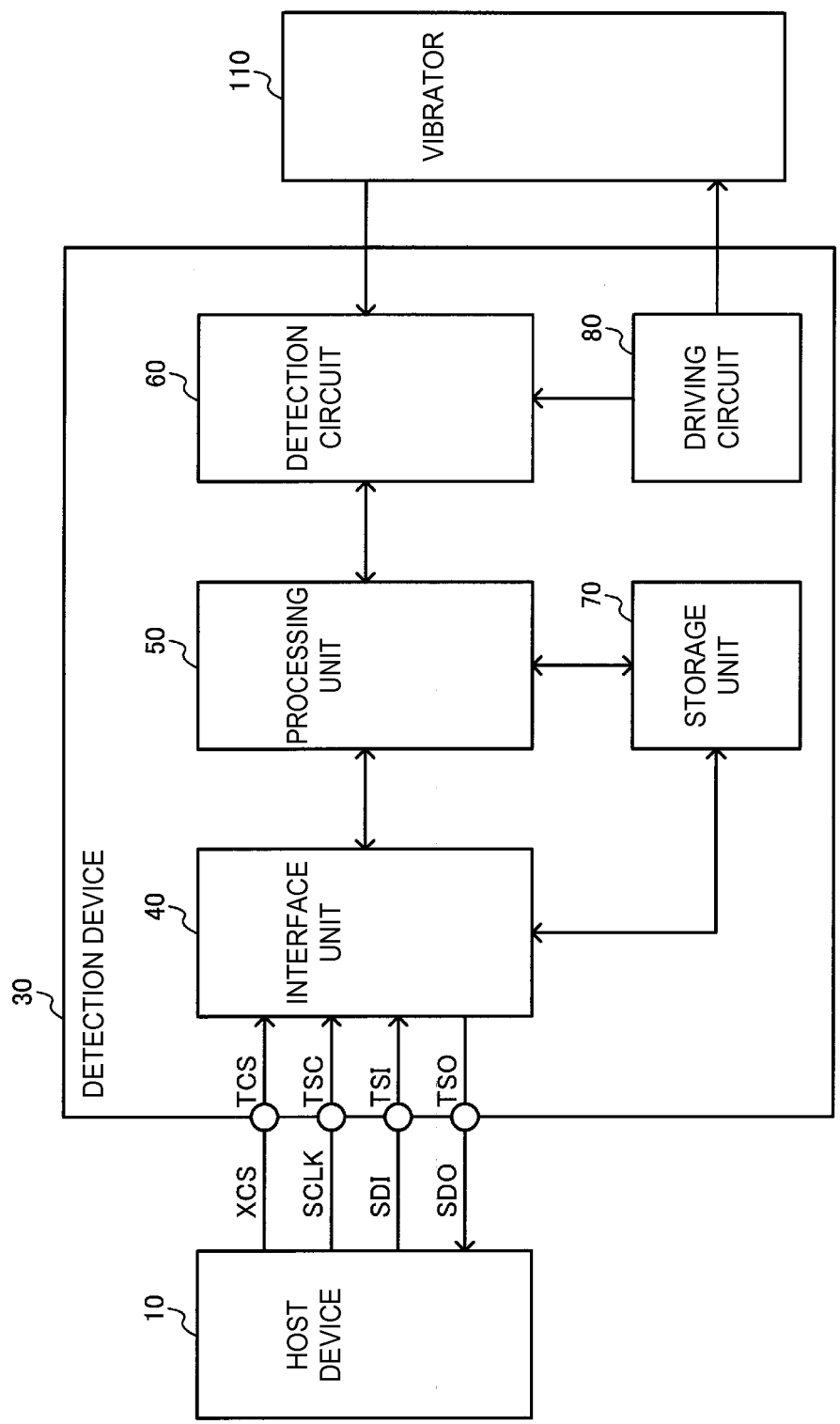
FIG. 7 illustrates a specific configuration example of the detection device.

Next, a specific configuration example of the detection device will be described. FIG. 7 illustrates a configuration example of the detection device 30 (30X, 30Y, and 30Z). In FIG. 7, the detection device 30 includes an interface unit 40, a processing unit 50, a detection circuit 60, a storage unit 70, and a driving circuit 80. The detection device 30 is not limited to the configuration shown in FIG. 7, and may have various modifications such as omission of some of the constituent elements or addition of other constituent elements.

The processing unit 50 performs various processes and controls which are necessary for an operation of the detection device 30. The processing unit 50 may be implemented by a processor such as a CPU or an MPU, a hardware circuit such as an ASIC, or the like.

The driving circuit 80 receives a feedback signal from a vibrator 110 (in a broad sense, a physical quantity transducer) and drives the vibrator 110. For example, the driving circuit 80 outputs a driving signal (a driving voltage) so as to drive the vibrator 110. In addition, the driving circuit 80 receives a feedback signal from the vibrator 110 so as to excite the vibrator 110.

The detection circuit 60 performs a detection process of a desired signal on the basis of a signal from the vibrator 110, and outputs detected data. For example, the detection circuit 60 receives a detected signal (detected current or electric charge) from the vibrator 110 which is driven by the driving circuit 80. A desired signal corresponding to a physical quantity which is applied to the vibrator 110 is detected (extracted) from the detected signal. For example, a desired signal corresponding to a Coriolis force is detected, and thus angular velocity data of rotation around a predetermined axis is obtained as detected data.

The interface unit 40 receives the chip select signal XCS, the clock signal SCLK, and the data input signal SDI from the host device 10 via terminals TCS, TSC and TSI. In addition, the data output signal SDO is output via a terminal TSO. The detection device 30 may be implemented by, for example, a semiconductor IC (semiconductor chip), and, in this case, the terminals TCS, TSC, TSI and TSO are pads or the like of the semiconductor IC.

Figure 8:
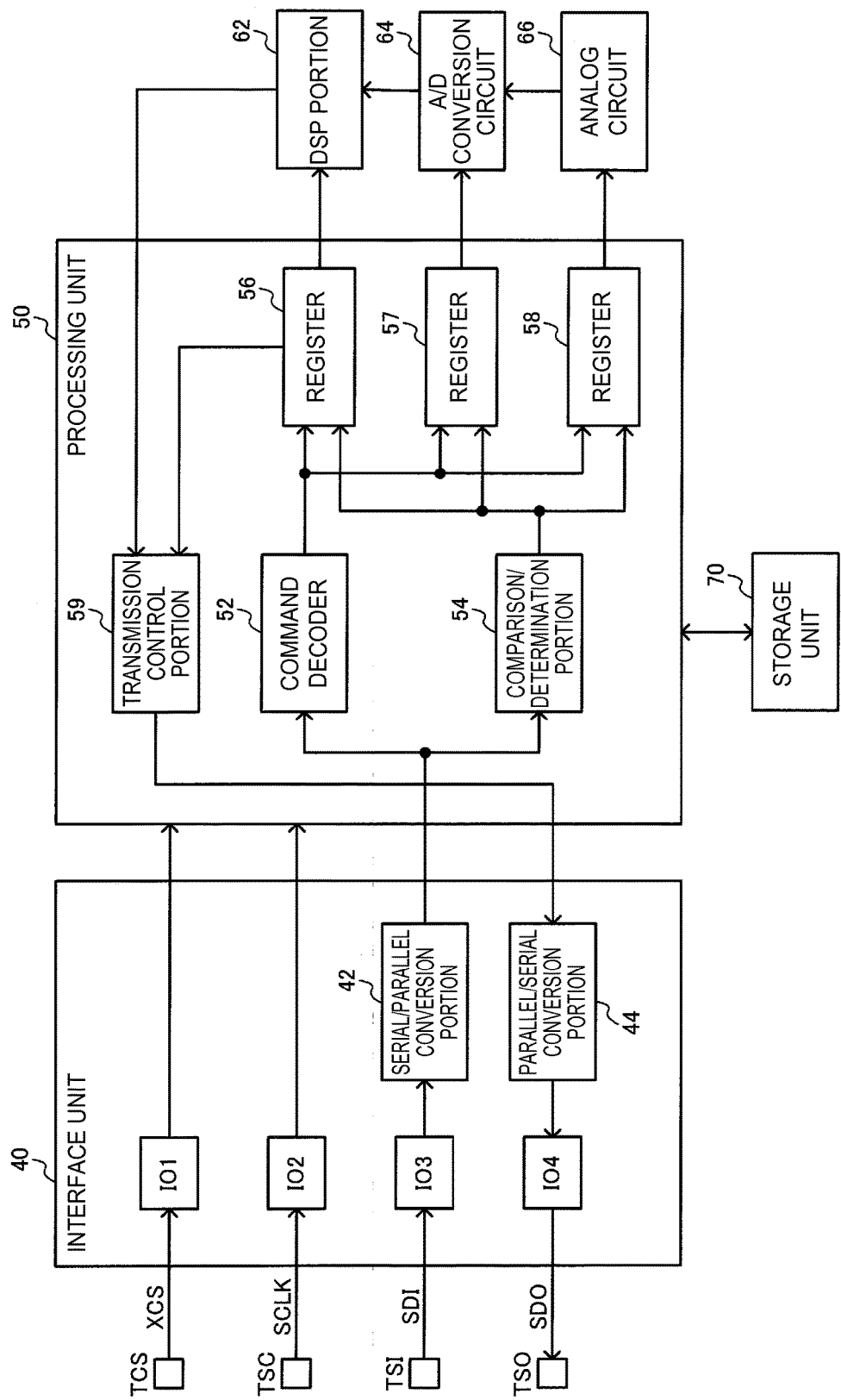
FIG. 8 illustrates a specific configuration example of an interface unit and a processing unit.

FIG. 8 is a diagram illustrating a specific configuration example of the interface unit 40 and the processing unit 50 of the detection device 30. The interface unit 40 and the processing unit 50 are not limited to the configuration shown in FIG. 8, and may have various modifications such as omission of some of the constituent elements or addition of other constituent elements.

The interface unit 40 includes I/O circuits IO1, IO2, IO3 and IO4, a serial/parallel conversion portion 42, and a parallel/serial conversion portion 44.

The I/O circuits IO1, IO2, IO3 and IO4 may be constituted by an input buffer, an output buffer, or an input and output buffer. The I/O circuits IO1 and IO2 are connected to the terminals (pads) TCS and TSC, and thus the chip select signal XCS and the clock signal SCLK are input thereto. The I/O circuit IO3 is connected to the terminal (pad) TSI, and thus the data input signal SDI is input thereto. The serial data input signal SDI (serial data) is input to the serial/parallel conversion portion 42, so as to be converted into a parallel signal (parallel data). On the other hand, a parallel signal from the processing unit 50 (a transmission control portion 59) is converted into a serial signal by the parallel/serial conversion portion 44. The I/O circuit IO4 outputs the serial signal to the terminal TSO as the data output signal SDO.

The processing unit 50 includes a command decoder 52, a comparison/determination portion 54, registers 56, 57 and 58, and the transmission control portion 59.

The command decoder 52 receives the parallel signal from the serial/parallel conversion portion 42 so as to perform a command decoding process. In other words, a command which is input by using the data input signal SDI is analyzed. The registers 56, 57 and 58 which are setting targets are selected, and various register settings are performed.

The comparison/determination portion 54 (slave selection register) compares a slave address stored in the storage unit 70 (nonvolatile memory) with an address which is designated by the host device 10 by using the data input signal SDI, and determines whether data writing to or data reading from the registers 56, 57 and 58 is performed. For example, the storage unit 70 stores the separate addresses described in FIG. 2 as slave addresses. The comparison/determination portion 54 performs writing to the registers 56, 57 and 58 in a case where an address designated by the host device 10 by using the data input signal SDI matches the separate address (slave address) thereof.

The register 56 is a register which performs various settings for a DSP portion 62 or the transmission control portion 59. The DSP portion 62 performs a digital filter process such as a filter process of removing an unnecessary signal from detected data or a filter process of limiting the bandwidth thereof. Frequency characteristics such as a cut-off frequency of the digital filter are set in the register 56.

The register 57 is a register which performs various settings for an A/D conversion circuit 64, and the register 58 is a register which performs various settings for an analog circuit 66.

The analog circuit 66 corresponds to various analog circuits (an amplifying circuit, a gain control circuit, a synchronous detection circuit, and the like) included in the detection circuit 60 and the driving circuit 80 of FIG. 7. The A/D conversion circuit 64 converts a desired analog signal which is detected by the analog circuit 66 (detection circuit) into digital detected data.

The DSP portion 62 performs various digital filter processes on the digital detected data from the A/D conversion circuit 64, so as to output detected data having undergone the digital filter processes. The transmission control portion 59 receives the detected data from the DSP portion 62, and performs transmission control on the detected data on the basis of the setting information of the register 56 or the information stored in the storage unit 70.

For example, it is assumed that the common address described in FIG. 2 is designated by the host device 10, and a read command is issued. Then, the transmission control portion 59 performs control for transmitting the detected data in the data transmission order thereof. For example, in FIGS. 6A and 6B, in the case of the detection device 30X, control for transmitting the detected data in the period T1 is performed. The data transmission order or the number of transmission data bits in this case is determined on the basis of the information read from the storage unit 70.

5. Multi-Axis Gyro Sensor

Figure 9:
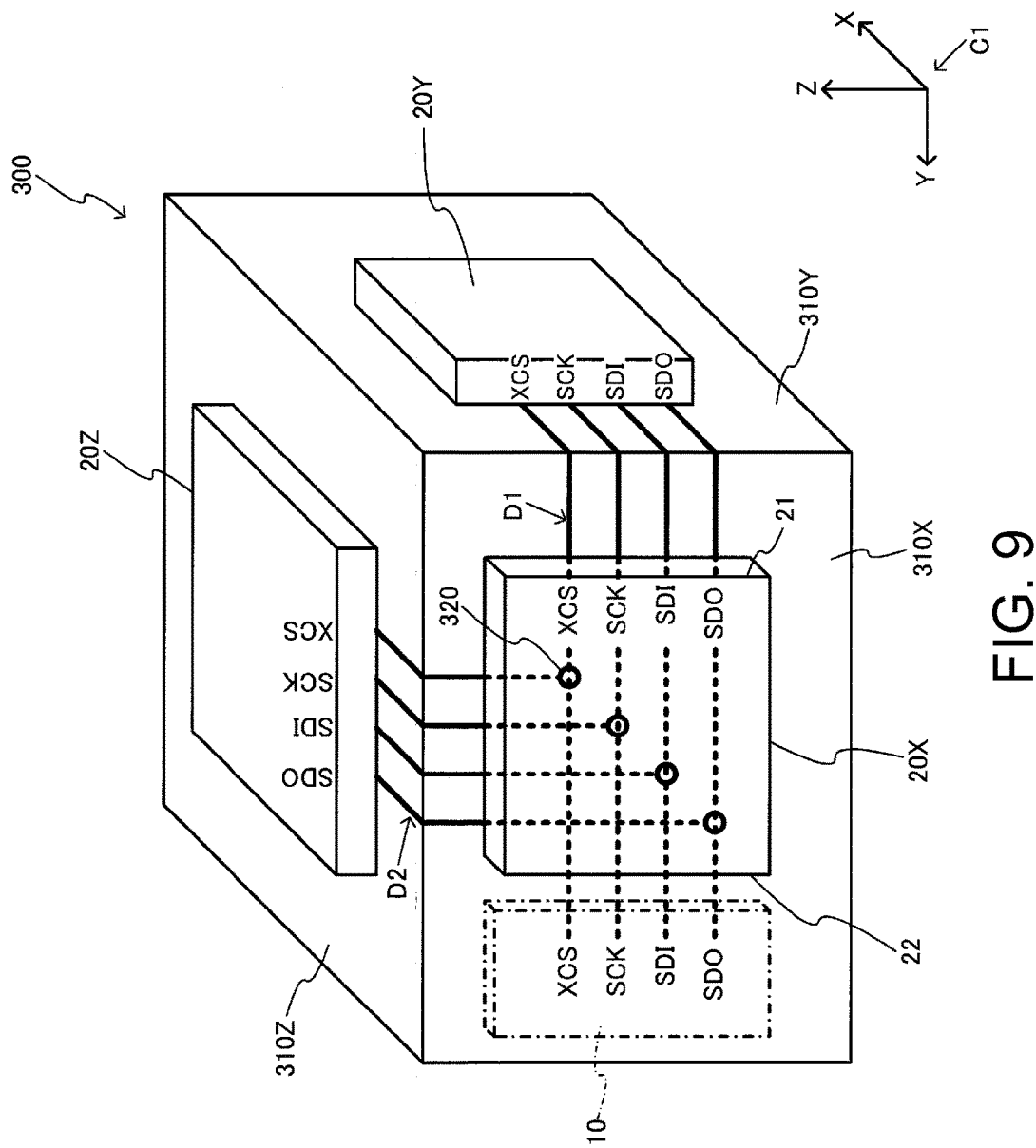
FIG. 9 illustrates an example of a mounting form of a multi-axis sensor.

FIG. 9 is a schematic perspective view of a three-axis sensor unit 300 which is an example of a multi-axis gyro sensor (in a broad sense, a multi-axis physical quantity sensor).

In the three-axis sensor unit 300 of FIG. 9, the sensor 20X is mounted on a wiring board 310X, the sensor 20Y is mounted on a wiring board 310Y, and the sensor 20Z is mounted on a wiring board 310Z. The wiring boards 310X, 310Y and 310Z are rigid boards which are perpendicular to each other. In other words, a face of the wiring board 310X and a face of the wiring board 310Y are perpendicular to (intersect) each other, and the face of the wiring board 310X and the face of the wiring board 310Y, and a face of the wiring board 310Z are perpendicular to (intersect) each other.

The sensors 20X, 20Y and 20Z are gyro sensors which have the X axis, the Y axis, and the Z axis indicated by C1 in FIG. 9, as detection axes. In other words, the sensor 20X is a gyro sensor which detects the angular velocity of rotation around the X axis. The sensor 20Y is a gyro sensor which detects the angular velocity of rotation around the Y axis, and the sensor 20Z is a gyro sensor which detects the angular velocity of rotation around the Z axis.

As indicated by D1 and D2 in FIG. 9, two sets of wiring groups whose wiring directions are perpendicular to each other are formed on the outer surfaces of the wiring boards 310X, 310Y and 310Z. Each set of wiring group includes four wires for transmitting signals such as XCS, SCLK, SDI and SDO. The wiring group indicated by D1 extends to a lower surface of the sensor 20X from a side 21 of the sensor 20X, and appears on a rear surface of the wiring board 310X via through holes 320 until reaching an opposite side 22. The host device 10 which has the sensors 20X, 20Y and 20Z as slaves is mounted on the rear surface of the wiring board 310X. The sensors 20X, 20Y and 20Z are electrically connected to the host device 10 via the wiring groups indicated by D1 and D2.

In a case where the mounting as illustrated in FIG. 9 is performed, terminal arrangements of the sensors 20X, 20Y and 20Z are required to be changed. For example, the terminal arrangement of XCS, SCLK, SDI and SDO in the sensor 20X is required to be different from the terminal arrangement of XCS, SCLK, SDI and SDO in the sensor 20Y. This is also the same for the sensor 20Z.

In order to change the terminal arrangements, for example, in FIG. 8, a multiplexer for changing signals which are input to and output from the I/O circuits IO1, IO2, IO3 and IO4 may be provided in the interface unit 40.

For example, in FIG. 8, TCS is a terminal for the chip select signal XCS, and TSO is a terminal for the data output signal SDO. In a case where the roles (arrangement) of the terminals are changed, for example, the multiplexer receives an output signal from the parallel/serial conversion portion 44, and outputs the output signal to the I/O circuit IO1. In the above-described manner, the data output signal SDO can be output from the terminal TCS via the I/O circuit IO1. In addition, the multiplexer receives an input signal from the I/O circuit IO4, and outputs the input signal to the processing unit 50 as the chip select signal XCS. In the above-described manner, the chip select signal XCS can be input to the processing unit 50 from the terminal TSO via the I/O circuit IO4.

In FIG. 8, TSC is a terminal for the clock signal SCLK, and TSI is a terminal for the data input signal SDI. In a case where the roles (arrangement) of the terminals are changed, for example, the multiplexer receives an input signal from the I/O circuit IO3, and outputs the input signal to the processing unit 50 as the clock signal SCLK. In the above-described manner, the clock signal SCLK can be input to the processing unit 50 from the terminal TSI via the I/O circuit IO3. In addition, the multiplexer receives an input signal from the I/O circuit IO2 and outputs the input signal to the serial/parallel conversion portion 42 as the data input signal SDI. In the above-described manner, the data input signal SDI can be input to the serial/parallel conversion portion 42 from the terminal TSC via the I/O circuit IO2.

As mentioned above, TCS can be set as a terminal for the data output signal SDO, and TSO can be set as a terminal for the chip select signal XCS. TSC can be set as a terminal for the data input signal SDI, and TSI can be set as a terminal for the clock signal SCLK. Therefore, it is possible to change terminal arrangements (roles of the terminals), and thus it is possible to appropriately correspond to the mounting form as shown in FIG. 9.

Figure 10:
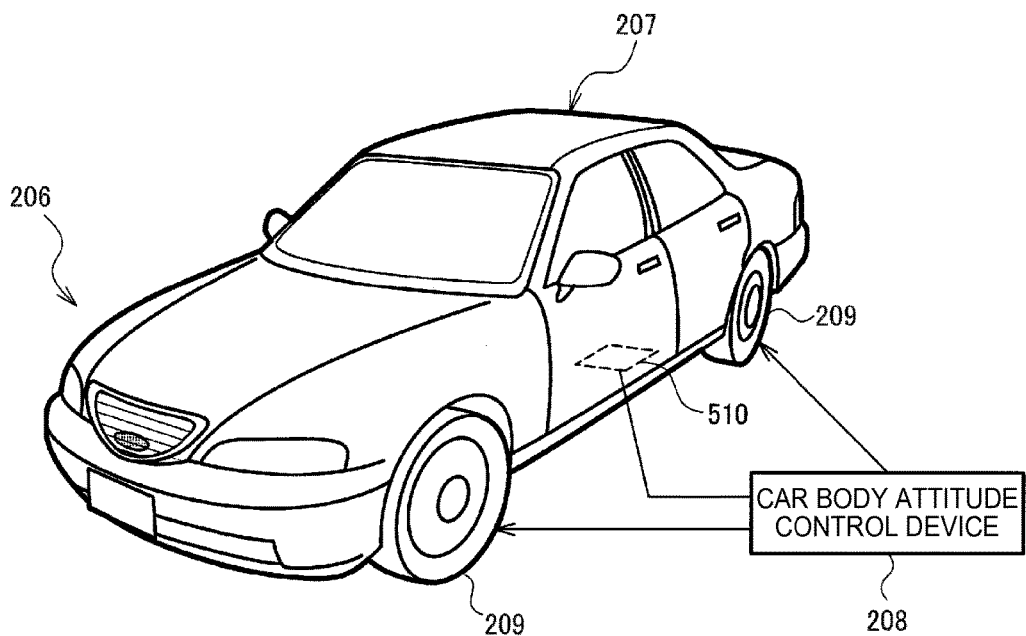
FIG. 10 illustrates an example of a moving object to which the detection device of the present embodiment is applied.

FIG. 10 illustrates an example of a moving object including the detection device of the present embodiment. The detection device of the present embodiment may be incorporated into various moving objects such as a car, an aircraft, a motorbike, a bicycle, and a ship. The moving objects are pieces of equipment or instruments which are provided with, for example, driving mechanisms such as engines or motors, steering mechanisms such as handles or rudders, and various electronic apparatuses, and move on the ground, in the air, and in the sea. FIG. 10 schematically illustrates an automobile 206 as a specific example of the moving object. A gyro sensor 510 (sensor) including the vibrator and the detection device of the present embodiment is incorporated into the automobile 206. The gyro sensor 510 can detect the attitude of a car body 207. A detected signal of the gyro sensor 510 may be supplied to a car body attitude control device 208. The car body attitude control device 208 may control the stiffness and softness of a suspension or a brake of each car wheel 209, for example, in accordance with the attitude of the car body 207. In addition, such attitude control may be used in various moving objects such as a bipedal walking robot, an airplane, and a helicopter. In order to perform attitude control, the gyro sensor 510 may be incorporated thereinto.

Although the present embodiment has been described as above in detail, it can be easily understood by a person skilled in the art that various modifications without substantially departing from the new matters and effects of the invention are possible. Therefore, these modifications are all included in the scope of the invention. For example, in the specification or the drawings, the terminologies (the vibrator, the gyro sensor, the angular velocity, and the like) which are mentioned at least once along with different terminologies (the physical quantity transducer, the sensor, the physical quantity, and the like) which have broader meanings or the same meanings may be replaced with the different terminologies in any location of the specification or the drawings. In addition, configurations of the detection device, the sensor, the electronic apparatus, or the moving object are also not limited to the above description of the present embodiment, and may have various modifications.

The entire disclosure of Japanese Application No. 2013-255893 filed Dec. 11, 2013 is expressly incorporated by reference herein.

What is claimed is:

1. A first detection device in a system including plurality of detection devices connected to a master host device, the first detection device comprising:
    a detection circuit that performs a detection process based on a signal from a physical quantity transducer and outputs detected data;
    an interface unit in communication with the master host device;
    a memory storing (i) a data transmission order of the first detection device relative to respective data transmission orders of the plurality of detection devices connected to the master host device and (ii) a separate address; and
    a processing unit that compares the separate address with an address designated by the master host device,
    wherein, in a case where the master host device designates an individual address and issues a read command, the interface unit transmits the detected data to the master host device only when the processing unit determines that the individual address designated by the master host device matches the separate address, and
    wherein, in a case where the master host device designates a common address and issues a read command, the interface unit transmits the detected data to the master host device according to the data transmission order relative to the respective data transmission orders of the plurality of detection devices connected to the master host device.

2. The first detection device according to claim 1, wherein the memory stores a total number of the detection devices which are connected to the host device.

3. The first detection device according to claim 2, wherein, in a case where the total number of detection devices is n, and the data transmission order is set to k (where 1£k£n), the interface unit transmits the detected data to the host device in a k-th order, and then transmits the detected data to the host device in a (n+k)-th order.

4. The first detection device according to claim 1, wherein the memory stores a total number of transmission data bits of the detected data, and
    wherein the interface unit transmits the detected data including the total number of transmission data bits to the host device in the data transmission order.

5. The first detection device according to claim 1, wherein the interface unit communicates with the host device via a clock signal, a data input signal, and a data output signal.

6. The first detection device according to claim 1, wherein the physical quantity transducer is a vibrator, and
    wherein the detection circuit detects angular velocity around a predetermined axis.

7. A sensor comprising:
    the first detection device according to claim 1; and
    the physical quantity transducer.

8. A sensor comprising:
    the first detection device according to claim 2; and
    the physical quantity transducer.

9. A sensor comprising:
    the first detection device according to claim 3; and
    the physical quantity transducer.

10. A sensor comprising:
    the first detection device according to claim 4; and
    the physical quantity transducer.

11. An electronic apparatus comprising the first detection device according to claim 1.

12. An electronic apparatus comprising the first detection device according to claim 2.

13. An electronic apparatus comprising the first detection device according to claim 3.

14. An electronic apparatus comprising the first detection device according to claim 4.

15. A moving object comprising the first detection device according to claim 1.

16. A moving object comprising the first detection device according to claim 2.

17. A moving object comprising the first detection device according to claim 3.

18. A moving object comprising the first detection device according to claim 4.

* * * * *